Patented Sept. 1, 1953

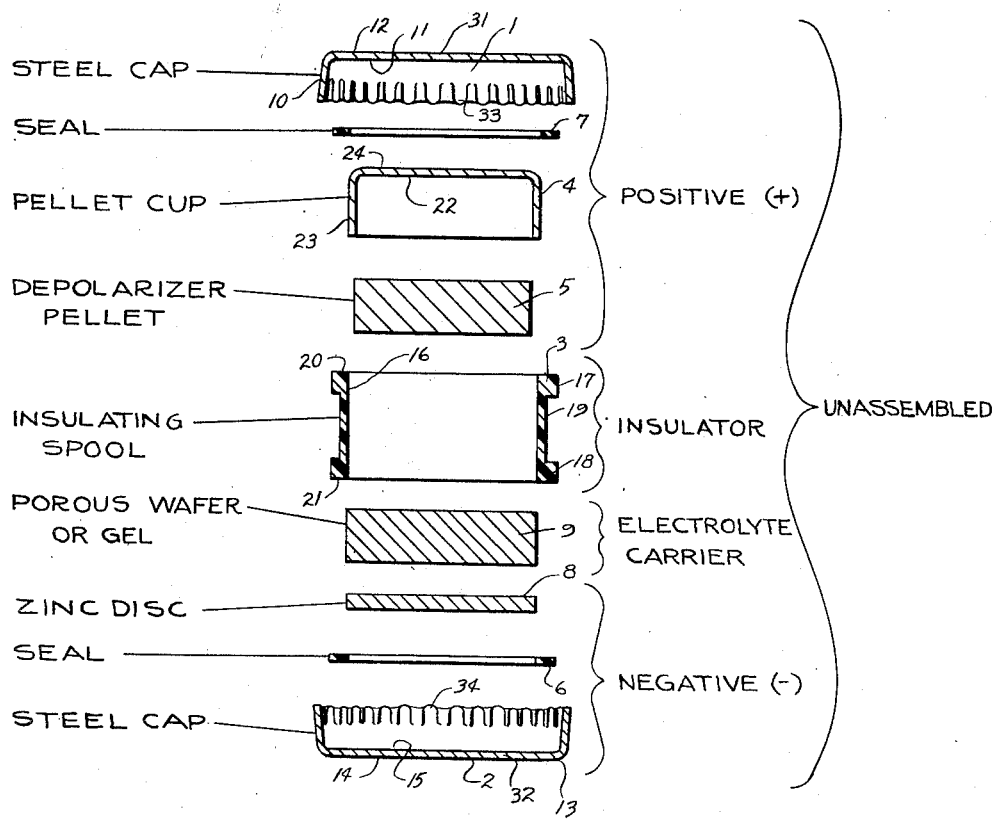
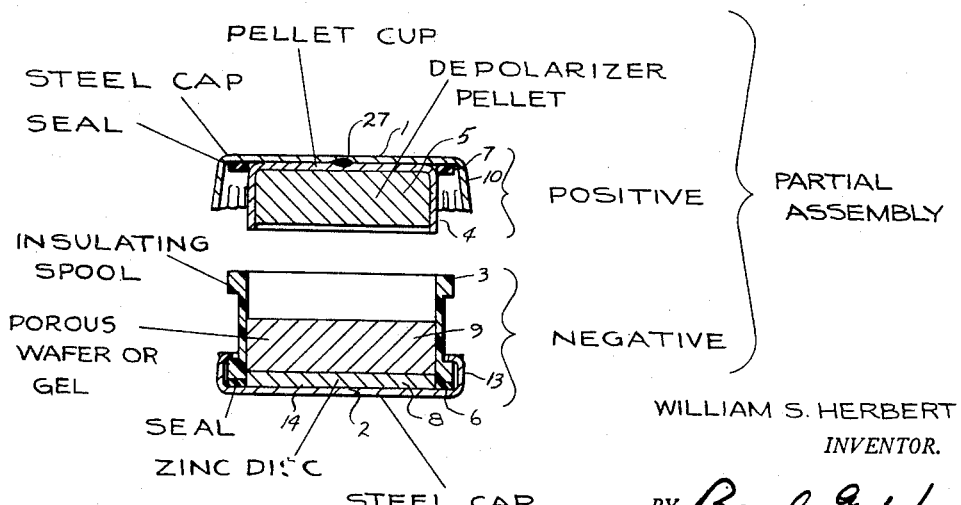

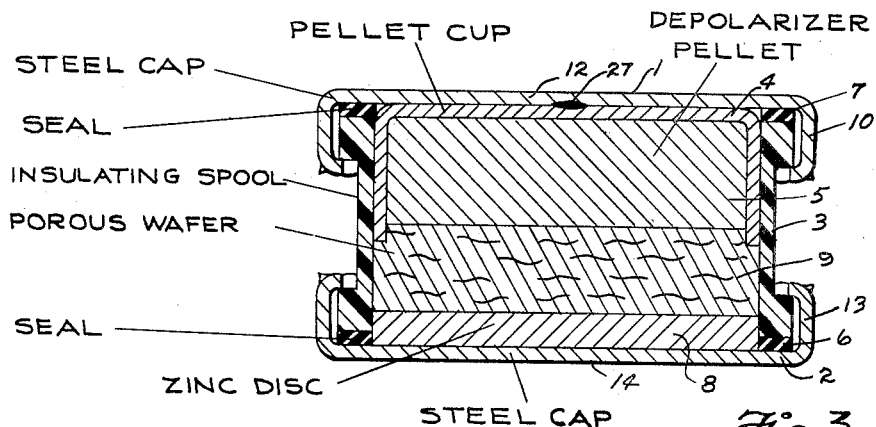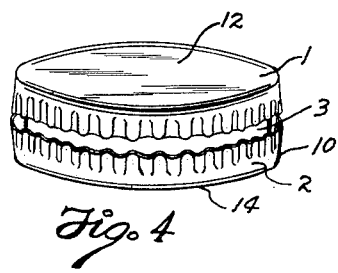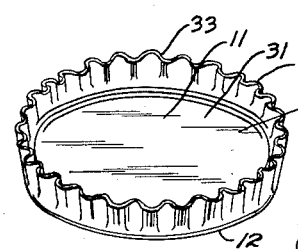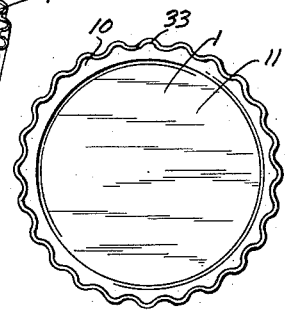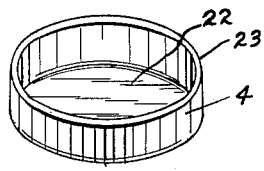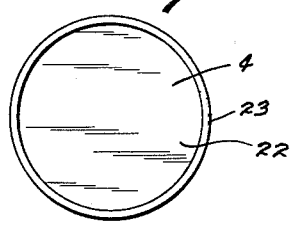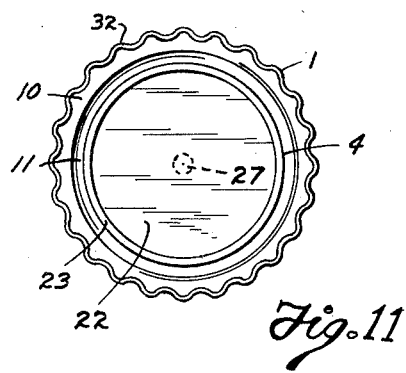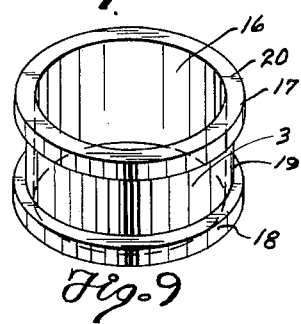

2,650,945

UNITED STATES PATENT OFFICE 2,650,945

PRIMARY DRY CELL

William S. Herbert, Madison, Wis., assignor to Ray-O-Vac Company, Madison, Wis., a corporation of Wisconsin Application July 8, 1949, Serial No. 103,593

23 Claims. (Cl. 136—111)

This invention relates to a primary dry cell and with more particularity a primary dry cell wherein an alkaline electrolyte is employed. This application is a continuation-in-part of applicant's copending application Serial No. 729,684, filed February 20, 1947.

The conventional dry cell, frequently called the "Leclanche" cell has been used for many years with quite satisfactory results in numerous fields of use of which one of the most common is in flashlights. There are, however, certain disadvantages which are inherent in the Leclanche type dry cells. They are conventionally made in cylindrical form. They have relatively short life when used under heavy drains. There has, for many years, existed a field of use and a potential demand for a dry cell battery which is not limited to the cylindrical shape of the Leclanche type cell and which has the properties of longer life or greater capacity even at relatively higher drains than can be satisfied by the Leclanche type dry cell. Somewhat more recently there has been a potential demand for a type of dry cell which can be assembled into a battery formed of multiple cells and which, when assembled, does not suffer from the unwieldy size, the space-wasting cylindrical shape and the limited life or low capacity of the Leclanche type dry cell. This more recent potential demand relates to cells used in portable hearing aids, portable radios, and like miniature equipment.

The history of this art suggested that some of the disadvantages of the Leclanche type dry cell could theoretically be overcome by utilizing an alkaline electrolyte in place of the electrolyte conventionally used in the Leclanche type cell. The earliest efforts along this line were directed toward alkaline wet cells, but such cells have at most very restricted uses. They are not readily portable and can only be operated in a fixed position, a factor which makes them incapable of being used in portable electrical equipment.

The history of the art also reveals that in the period from about 1890 to about 1920, many workers in the art, particularly foreign workers and more particularly German or Swiss inventors, took out patents on various forms of alkaline dry cells as improvements on the Lalande cell. So far as I am aware, these prior, relatively ancient, patents were never followed by the commercial production within or importation into the United States of satisfactory alkaline dry cells. Somewhat more recently, United States patents have been taken out on alkaline dry cells which, on first inspection, appear to have marked advantages over either the Leclanche type or Lalande type dry cells but which when subjected to use are found to have some very appreciable disadvantages. An example of the type of more modern alkaline dry cell is disclosed in United States Patent No. 2,422,045 to Ruben. The cells disclosed in this patent have certain basic disadvantages:

The depolarizers employed, including $Ag_2O$, $HgO$, and $CuO$, are expensive and markedly increase the cost of production. The construction employed is complicated and does not lend itself readily to mass production, likewise greatly increasing the costs of production. Recognizing the corrosive nature of the electrolyte, efforts have been made to reduce the possibility of electrolyte damage by placing the cell contents in a steel cup, or can, and sealing into the upper surface of the can an insulated metallic cover. Since the can, or cup, functions as one of the cell terminals, while the metallic cover functions as the second cell terminal, both cell terminals are in effect disposed at the same end or side of the cell. This construction makes it difficult to superimpose one cell upon another so as to create a multiple cell battery, because extra connectors and insulating members are required between each pair of adjacent cells. The chemicals selected for depolarizer materials and the other chemically active ingredients in the cell, are prone to generate gas after discharge. The uncontrolled generation of such gas raises the possibility of explosion or leakage of the caustic electrolyte and, sometimes, liquid mercury. The overcoming of this disadvantage requires going to further extra cost in the construction of the cell or in the use of additional expensive depolarizer. The creation of an effective insulating seal between the steel cup and the metallic top plate requires an expensive grommet and even when this expense is incurred, the danger of leakage of electrolyte is not eliminated. The cells most generally are characterized by having an abrupt voltage drop near the end point; thus a user has virtually no warning that the battery is approaching the end of its useful life. Notwithstanding their expense, the depolarizers suggested in these recent patents are at least slightly soluble in alkaline electrolyte and are capable of causing serious degrading effects in the cell. There is also the danger of deposition of foreign material such as metallic copper on the zinc anode, thus stimulating excessive corrosion of the zinc. Efforts have been made to avoid such deleterious results by incorporating in the cells barrier elements to augment the cellulosic spaced elements. Even when barriers are used, the internal malfunctioning of the cell is not entirely eliminated. Where, as is recommended, an absorbent or spacer material is employed, there is a distinct danger of oxidation and resultant degradation of the cellulosic spacer materials.

The present invention contemplates an alkaline dry cell which is not only deisgned to overcome the disadvantages briefly mentioned above, but which, for the first time, will make available for mass production and realiable usage a primary alkaline dry cell which will satisfy the following objectives:

A dry cell with high capacity per unit volume. A dry cell so constructed as to have its terminals at opposite ends (or sides) of the cell, thus making quite simple the construction of multiple cell batteries. A dry cell of such size and shape as to permit the construction of multiple cell batteries which will not be cylindrical in overall shape, or if constructed as cylindrical batteries, will have battery dimensions which will be a mere fraction of the overall dimensions of a Leclanche type battery of equivalent capacity. A dry cell which has virtually no leakage of electrolyte or other materials after discharge, or during discharge. A dry cell in which the gas generation is so minimized, both during and after discharge that no provision need be made for venting the cell, with the increased danger of electrolyte leakage which accompanies such vents. A dry cell in which such gas as is generated is in amounts so small that the generated gas may be confined within the interior of the cell and when so generated, at most has a tendency to expand, very slightly, the end terminals of the cell thus increasing desired cell-to-cell contact in multiple cell batteries. A dry cell with a gradual voltage drop near the end point so that the need of replacement is indicated to the user. A dry cell with a depolarizer which is not only cheap but is formed of ingredients which are almost completely insoluble in alkaline electrolytes, thus, eliminating the harmful effects on any absorbent material, and on the zinc anode, which have characterized prior art alkaline cells. An alkaline dry cell which does not require the use of an expensive grommet and which does not require the use of a barrier between the depolarizer and any absorbent used. A dry cell which is capable of withstanding relatively high drains and which under abnormal drains possesses longer life and greater capacity than prior art dry cells of either the Leclanche type or the Lalande type.

The foregoing objects are obtained and the disadvantages of prior art dry cells are overcome by the alkaline dry cell which is the subject of this application. In the accompanying drawings, which illustrate one embodiment of the invention, like reference numerals refer to like or similar elements:

Figure 1 is a composite side elevational view, in cross-section, of the various elements of the cell and wherein the elements are unassembled.

Figure 2 is also a composite side elevational view, in cross section, of the partially assembled positive sub-assembly and the partially assembled negative sub-assembly, the two sub-assemblies being arranged in the manner in which they may be brought together for final assembly.

Figure 3 is a side elevational view in cross-section of the assembled cell.

Figure 4 is an exterior view of the assembled cell taken from a position to one side and slightly above the cell.

Figure 5 is a detail view of one of the caps, useable on either end of the cell, as viewed from a position to one side and slightly above.

Figure 6 is an interior plan view of the cap shown in Figure 5.

Figure 7 is a detail view of one of the pellet cups taken from a position to the side and slightly above.

Figure 8 is an interior plan view of the pellet cup shown in Figure 7.

Figure 9 is a detail view of the insulating spool taken from a position to the side and slightly above.

Figure 10 is a vertical plan view of the insulating spool shown in Figure 9.

Figure 11 is an interior plan view of the cap, similar to Figure 5, but having positioned thereon the pellet cup.

Referring more particularly to Figures 1 and 2 of the drawings, 1 represents a positive metallic cap and 2 represents a negative metallic cap; 3 is an insulating spool; 4 is a metallic cup; 5 is a mass of depolarizer, preferably in pellet form; 6 and 7 are seals or gaskets; and 8 is a zinc disc or wafer, while 9 is an electrolyte carrier which may be a porous wafer or gel.

Desirably, the positive cap 1 should be inactive, or at least passive, in contact with an alkaline electrolyte. Plain steel, or stainless steel having more or less chromium content, or nickel plated steel are suitable materials since such materials have the required strength and rigidity when employed in metal of the required gauge thickness. Ordinary steel is preferred because of its cheapness. It is desirable that the material used in the positive cap be resistant to any chemical action from the depolarizer alone, or from the depolarizer when in contact with an alkaline electrolyte.

2 represents the other or negative cap. The negative cap may for some purposes be formed of ordinary steel as was the case of the positive cap. Preferably, however, the negative cap should be formed of a metal which is compatible with the zinc anode so that undesirable corrosion of the zinc anode is not caused by contact with the negative cap. Tin plated steel has been found to be a very suitable material for the negative cap. The tin may be applied to the steel either by a hot dip process or by electro-plating. Even further improvement can be had, in some cases, by amalgamating the tin plate of the negative cap either before assembly or after the cell has been completely assembled. Negative caps made entirely of zinc, or of cadmium coated steel, have been successfully used. Where ordinary steel has been used, it has been found desirable to take some precautions against unwanted corrosion of the zinc anode. One precaution which may be taken is to employ an auxiliary thin disc of zinc, inside of the negative cap, to separate the zinc anode from the surface of the steel cap. It has been found preferable to avoid the use of such an auxiliary zinc disc wherever possible since the disc is likely to become amalgamated by any mercury which migrates from the zinc anode. The embrittlement resulting from such amalgamation has a tendency to cause the zinc disc to crack and create the possibility of leakage of electrolyte. This same relative disadvantage exists when zinc caps are used for the negative cap.

With respect to both the positive cap 1 and the negative cap 2, it is desirable to have the caps formed of a metal which has both the requisite inherent strength and sufficient thickness so as to be strong enough to resist expansion caused by any internal pressure generated within the cell while still having some flexibility so as to deform slightly. At the same time the caps should be strong enough to retain a firm grip on the flanges of the insulating spool. The metals mentioned above have these properties.

The insulating spool 3 must be of such composition that it will be resistant to attack from a strong alkaline electrolyte and from any product of any chemical reaction occurring within the cell. It must also be sufficiently rigid so that it retains its shape and dimensions at all ordinary temperatures. It must be a non-conductor. While glass or other ceramic materials may be employed in the forming of the insulating spool, preferably a spool formed of a synthetic plastic composition is employed. A material which has the advantages of relative cheapness and which may be easily fabricated by injection molding or by machining or grinding from tubular stock has definite advantages in reducing the difficulties and costs of forming the insulating spool. Poly-styrene is a suitable insulating plastic which has all of the desirable properties mentioned above. The insulating spool 3 may vary somewhat in shape but a preferred form is that of a spool or cylinder having a cylindrical inner bore bounded by inner wall 16. A considerable portion of the wall 19 of the insulating spool is relatively thin; this is the intermediate portion. The upper and lower peripherial edges 17 and 18 of the spool are thickened and extend as flanges beyond the surface of the outer wall 19 of the spool. These flanges may be formed with angular corners or the corner edges of the flanges may be somewhat rounded. The top annular surface 20 of the spool and the bottom annular surface 21 of the spool are desirably smooth and flattened for a purpose which is to be explained later.

Reverting to the positive cap 1, it will be observed that the cap has a marginal wall 10 which extends outwardly at an angle from the main horizontal plane of a cap top 31. The cap top is desirably circular and has a flat outer surface 12 and a flat inner surface 11. Desirably, the marginal periphery of the wall 10 is crimped or fluted as shown at 33. While the negative cap 2 may differ in actual form from cap 1, it is desirable from the viewpoint of manufacturing economy to form it identically with the structure of positive cap 1. Thus, negative cap 2 has side wall 13, and flat circular portion 32 which has a flat outer surface 14 and a flat inner surface 15. The marginal edges of wall 13 may be suitably crimped or fluted as shown at 34. The inner diameters of the inner surface 11 of positive cap 1 and the corresponding inner surface 15 of negative cap 2 are desirably identical with, or deviate but slightly from, the greatest diameter of the insulating spool, at top surface 20 and bottom surface 21 thereof.

Pellet cup 4 is preferably made of the same material as positive cap 1. It is desirable that the pellet makes efficient electrical contact with positive cap 1 in order to keep the internal resistance of the cell at a low value. This objective can be accomplished by providing small projections on the top surface 24 of the pellet cup, or by embossing small projections on the inner surface 11 of the positive cap. It is preferred, however, to weld the top surface 24 of the pellet cup to the inner surface 11 of the positive cap. Spot welding has proven to be a very quick and satisfactory method for joining the pellet cup and positive cap in the desired relationship as to position and efficient electrical contact. It is even possible to provide a joint by soldering, but welding is preferred since a surer contact is established and no foreign metal is introduced as would be required by soldering. The cup has a flattened surface which presents a circular exterior top 24 and a circular interior bottom 22; annular marginal wall 23 is preferably at substantially right angles with the plane of the cup bottom. The exterior diameter of the pellet cup is necessarily somewhat less than the diameter of the positive cap and preferably is almost identical with the inner diameter of the bore of the insulating spool formed by its interior wall 16. The marginal wall 23 of the pellet cup will be somewhat higher, or longer, than the marginal wall 10 of the positive cap and, in turn, will be somewhat shorter than the axial length of the bore of the insulating spool 3.

The depolarizer pellet is preferably formed of an intimate mixture of finely divided manganese dioxide and graphite. It has been found desirable to preform the mixture by pressing the mixed components into the form of a pellet (the compression being carried out under high pressure), and then inserting the pellet into the internal recess of the pellet cup. It is preferred to adjust the thickness of the depolarizer pellet so that it rests slightly below the outer rim of wall 23 of the pellet cup. It is difficult to insert the depolarizer pellet into the pellet cup, while having the exposed surface of the depolarizer pellet flush with the outer marginal rim of wall 23, without experiencing some chipping along the edges of the depolarizer pellet. The loosening or detaching of fragments of depolarizer caused by such chipping may cause some internal shorts, a result which is avoided by adjusting the thickness of the pellet so the pellet is recessed within, and does not occupy the entire capacity, of the pellet cup.

A suitable seal, which may be a washer or gasket in the form of an annulus 6, is provided for insertion within the recess of the negative cap 2 and for placement parallel to and adjacent the inner surface 15. Desirably, if a washer or gasket is utilized, the bore of this element will have a diameter closely approximating the inner diameter of the insulating spool 3 and the effective body of the seal or gasket will be wide enough so as to extend substantially coextensively with the bottom annular surface 21 of insulating spool 3. A similar seal 7 is desirably provided for placement adjacent the inner surface 11 of positive cap 1. This seal, if it be a gasket or ring, should preferably have a bore the diameter of which is substantially the same as the outer diameter of the pellet cup 4. The effective body of the seal, if it be a gasket or ring should be wide enough to extend substantially coextensively with the top annular surface 20 of insulating spool 3.

The zinc anode 8 may be used in several forms but in any form used is preferably amalgamated to a considerable degree. It is possible to use a circular zinc plate of appreciable thickness, or a plurality of parallel thin zinc discs. Where the anode is made of coherent zinc of the forms discussed just above, a somewhat lower order of amalgamation is preferable since less mercury is necessary to depress the rate of solution of the zinc in the electrolyte. Desirably, however, the zinc anode is prepared in the form of a zinc wafer, pellet, or disc fabricated by amalgamating zinc powder and then pressing the amalgamated zinc powder into the form of a pellet utilizing moderate pressures. This produces appreciable porosity within the body of the pellet and increases the ability of the pellet to absorb some electrolyte. The zinc powder should be of relatively high purity and particular care should be taken to see that it is free from metals such as nickel, cobalt, or iron which are passive in an alkaline electrolyte. The amount of mercury required in amalgamation varies somewhat depending upon the method used in the amalgamation and the ultimate area of the zinc anode which is to be exposed to the electrolyte. By "ultimate area," it will be understood that reference is made not only to the true external surface area, but to the internal surface area of voids within the pellet. In general, the amount of mercury used depends somewhat on the exact electrolyte used, but in most cases from about 5 per cent to about 15 per cent of mercury, by weight, with about 95 per cent to about 85 per cent of zinc, by weight, produces a suitable zinc pellet. Whether a coherent zinc plate or a compressed powdered zinc pellet is used, the anode is preferably formed in the shape of a thin flat circular disc which has an exterior diameter very slightly less than the diameter of the interior bore of insulating spool 3.

The electrolyte carrier 9 may be a gelled electrolyte. Preferably, however, a porous wafer is employed. This wafer should be formed of a highly porous material capable of absorbing and holding the electrolyte. It must also be capable of acting as a resilient spacing element so as to insure the physical separation of the zinc anode 8 from the depolarizer pellet 5. The wafer should have a high degree of moisture retentiveness while being expanded or contracted by forces operating within the cell—thus it should not be readily deprived of absorbed electrolyte when compressed. The porous wafer should be highly resistant to chemical decomposition such as might be generated by an alkaline electrolyte. Ordinary paper and some forms of cellulosic materials have been tested but have been found to possess a tendency toward shrinkage upon continued exposure to alkaline electrolyte. This shrinkage is probably caused by chemical change rather than purely physical change in the structure of the cellulosic fibers. This tendency has been overcome by employing such materials as finely porous cellulose sponge or by pads made of loose absorbent paper composed of cotton fibers. As stated above, the electrolyte can also be in the form of a gel electrolyte. A precast or pre-cut wafer of gel may be used. It is possible to use a film which swells to a gel when the electrolyte is added. It is also possible to combine, as a laminate or impregnate, a gel and a base such as a cellulosic wafer, so as to obtain the advantages of both gelled electrolyte and porous wafer. There are several suitable gelling agents but sodium carboxymethyl cellulose has been found to give good results since it is quite stable in the presence of the concentrated alkaline electrolyte and an adequate gel can be formed with but small amounts of the compound.

The electrolyte, as such, does not appear as an element in the drawings. The electrolyte is essentially a water solution of an alkaline hydroxide, preferably sodium or potassium hydroxide; of the two, potassium hydroxide is preferred. A satisfactory cell constructed in accordance with this invention can be produced with a potassium hydroxide or sodium hydroxide (or a mixture of the two) electrolyte solution. Certain variations are permissible, although the use of such variations insofar as they involve substitution for potassium hydroxide or sodium hydroxide, are not preferred. Thus, lithium hydroxide or even alkaline earth hydroxides may be employed in the form of solutions as the electrolyte. While the use of the more common potassium or sodium hydroxides alone produce satisfactory results, even better results are obtained by careful control of the concentration of the electrolyte solution and by modifying the alkaline hydroxide electrolyte solution by adding zinc oxide, dissolved in the electrolyte as zincate. When the zinc is added to the electrolyte in the form of zinc oxide there is produced a solution of the zincate of the alkaline metal, present in the electrolyte as hydroxide. For example, where the electrolyte comprises a solution of potassium hydroxide and zinc oxide is added to the solution, zinc oxide reacts with some of the potassium hydroxide to form potassium zincate in the solution. When so added, the chemical reaction by which the zincate is formed is reversible. It has been found, contrary to prior art teachings, that the amount of dissolved zinc oxide required for beneficial results varies inversely with the concentration of the electrolyte. The more concentrated electrolytes require less dissolved zinc oxide and produce an electrolyte characterized by a practical minimum rate of gas generation; they are, however, relatively more viscous and less conductive. The less concentrated electrolytes have greater conductivity, are somewhat easier to distribute within the cell and require larger quantities of dissolved zincate. In general, the zinc oxide added to form the zincate in solution is a minor fraction of the amount of zinc oxide required to form truly saturated solutions of zincate in the electrolyte. As an example, a suitable electrolyte may be composed by using 100 parts, by weight, of potassium hydroxide, 100 parts, by weight, of water, and 5 parts, by weight, of zinc oxide. The electrolyte solution is formed by using chemically pure potassium hydroxide, containing 85 per cent or more potassium hydroxide, computed on a dry basis, dissolving the potassium hydroxide in sufficient water to form a solution, dissolving the desired amount of pure zinc oxide in this solution, using heat if necessary to insure complete solution of the zinc oxide, and then adding make-up water to give the desired relative amounts of water, dissolved potassium hydroxide and dissolved potassium zincate.

*Mode of assembly*

The alkaline dry cell, described above, may be assembled by carrying out the following sequential steps. It will be understood that in general, the cell may be considered to consist of four sub-assemblies. These are the positive sub-assembly, the insulating spool, the electrolyte carrier, and the negative sub-assembly.

Starting with the positive sub-assembly, the pellet can 4 may be spot welded to the positive cap 1 in such a manner that the pellet can is properly centered on the interior face of the positive cap. Next, the depolarizer mix is pressed or formed into a pellet 5 which is preferably of substantially the same dimensions as the interior of the pellet can. Desirably, the depolarizer pellet is moistened during formation, or immediately after it has been pressed within the pellet can, and is then subjected to compression so as to tamp the pellet firmly and solidly in place within the pellet can. Desirably, as a result of these operations, the outer surface of the depolarizer pellet will lie very slightly below the outer edges of the pellet cup.

Starting with the negative sub-assembly, the negative cap 2 has placed on its inner face an annular gasket 6, or the inner face may be coated near its periphery with a sealing compound, so as to provide a seat for one end of the insulating spool. Where a sealing compound is used, it is desirable to coat the appropriate end of the spool, in preference to the inner face of the negative cap. The insulating spool 3 is then placed on the gasket or on the surface of the interior face of the negative cap 2 and the edges of the negative cap are then crimped over the outer lip 18 of the insulating spool. Desirably, the crimping operation should be conducted under pressure so that the bottom annulus 21 of the insulating spool is firmly urged against the interior face 15 of the negative cap and held tightly in this position during and after the edges of the cap are crimped. Thereafter, the zinc pellet or disc 8 is dropped into the hollow bore of the insulating spool in such a manner that the juxtaposed faces of the zinc pellet and the negative cap are in contact. Desirably, the zinc pellet will be lightly tamped on or pressed into place in a manner somewhat similar to the tamping of the depolarizer pellet in the depolarizer pellet can. Thereafter, the absorbent wafer 9 is dropped into place immediately over the zinc pellet and within the bore of the insulating spool. The top, or open end, of the insulating spool may then be coated with a sealing compound and additionally, or alternatively, a ring gasket 7 may be placed within the positive cap in the anulus between the depolarizer cup side wall 23 and the positive cap side wall 10.

With the positive sub-assembly having been prepared as indicated above, and the negative sub-assembly having been prepared with one end of the insulating spool crimped in position within the negative cap the two sub-assemblies appear as shown in Figure 2. The required amount of electrolyte is then metered into the open end of the bore of the insulating spool in the negative sub-assembly. The metered amount of electrolyte is absorbed by the absorbent wafer and the subjacent zinc pellet in the negative sub-assembly. The positive sub-assembly is then turned over so that its inner face is opposed to the inner face of the negative sub-assembly, the depolarizer pellet can is slid into the bore of the insulating spool and sufficient pressure is exerted so that the, as-yet-unsealed, open end of the insulating spool presses firmly against the seal or gasket 7 in the annulus between the pellet cup and the positive cap. While being held together under this pressure, the edges of the positive cap are crimped firmly around the upper lip of the insulating spool.

The positive and negative sub-assemblies of the cell are now insulated from each other by the insulating spool yet are each held firmly in position by having the positive cap 1 and negative cap 2 both crimped around the lips of the insulating spool. The marginal ends of the insulating spool are sealed within the caps and to the interior faces of the negative cap and the positive cap respectively. Within the cell, the depolarizer pellet, held in position within the depolarizer pellet cup, is in physical contact with the absorbent wafer and the absorbent wafer is in physical contact with the zinc pellet. The zinc pellet is in conductive contact with the negative cap and the electrolyte-wet absorbent wafer. The depolarizer pellet is in electrical contact with the electrolyte-wet absorbent wafer and, through the depolarizer pellet cup, is in electrical contact with the positive cap.

Certain modifications in the foregoing sequential steps may be employed. Thus, in preparing the positive sub-assembly, it has been found that instead of prefabricating a depolarizer pellet from the mixture of depolarizer compounds and then moistening the preformed pellet, either before or after insertion into the depolarizer pellet can, it is possible and in some cases desirable to meter a desired amount of loose depolarizer mix directly into the pellet can and then by placing the mix under pressure, consolidate the mix into a pellet formed in situ in the depolarizer pellet can. Where the depolarizer pellet is preformed, it is preferable to pre-wet the mix with electrolyte before inserting the pellet into the depolarizer pellet can. It has also been found desirable in some instances to insert the depolarizer pellet into the can or form the pellet in situ within the can, as explained above, before the depolarizer pellet can is welded to the positive cap. Thus, the depolarizer cup may first be welded to the positive cap and then filled with the depolarizer or the depolarizer cup may be filled with depolarizer and the filled cup then welded to the positive cap.

In the negative sub-assembly, certain modifications may be employed. In some instances, the use of a gasket ring as a seal or seat for the negative end of the insulation spool has been resorted to without any supplemental treatment. In general, however, it is preferred either to augment the gasket, with a sealing compound or to replace the gasket with one or more types of sealing compound. Where a gasket is employed, it may be a ring or washer made of natural or synthetic rubber. Certain synthetic compounds having the properties of rubber, such as neoprene (chloroprene) or Hycar (Buna N or nitrile rubber) have been found to give excellent results under severe tests. Where the gasket or washer is replaced, or supplemented, it has been found that a thin film of material which possesses both resiliency and adhesion may be coated or applied to the end of the insulating spool. Suitable compounds for this seal may contain water dispersions or latices of either natural or synthetic rubbers. However, other suitable compounds exist and may be applied, either as solutions in suitable organic solvents, or as liquids which have been heated to give the desired viscosity and film forming properties when hot and which when cool will possess the desired sealing characteristics of resiliency and adhesion. Hot melt formulations containing plastics, certain of the micro-crystalline waxes and silicones having the properties which I have mentioned above have demonstrated their ability as sealing compounds to stand up successfully under many test conditions.

It is, however, recognized that dry cells may be subjected to use under very rigorous conditions far beyond the normal contemplated usage. To safeguard against failure under extreme conditions of usage, it may be desirable to augment a given sealing compound by the application of a second coating of a different nature. This may be applied on both the positive and the negative caps of the cell or may be employed only at the negative end of the cell. For such secondary sealing compound, hydrocarbon, or petroleum hydrocarbon, derivatives, such as petrolatum or a lubricating oil may be utilized. It is also possible to utilize, either mixed with, or in place of, such petroleum compounds, a rust inhibitor compound, such as barium salts of sulphonated alicyclic acids. In view of the recognized solvent properties of hydrocarbon oils on natural rubber, where an essentially oily compound is used as a secondary sealing compound, it is advisable either to use for the gasket one of the synthetic rubbers, such as chloroprene or nitrile rubber or Buna N, which have more resistance to oils and greases, or to replace the gasket with a hot melt or silicone primary seal.

In the modification shown in the drawings, the top and bottom marginal edges 20 and 21 of the insulating spool are flat over their entire areas. Under some circumstances it is desirable to notch or cut away the peripheral edge of the bottom surface 21, and in some cases the top surface 20 as well. The notching of the edge, or edges, on the plastic spool provides an annular seat which will accommodate a gasket, or a ring, of slightly greater internal diameter than the ring shown as 6 in Figure 1. The advantage of this modification is that the gasket or ring has a vertical seat as well as a horizontal seat against the insulating spool.

Preparation of materials

In preparing the depolarizer-cathode, finely divided manganese dioxide and finely divided graphite are the preferred materials. Where the symbols $MnO_2$ are used in this specification, they will be understood to mean a product which largely consists of the dioxide of manganese as such but which neither consists exclusively of the chemically pure dioxide (100% $MnO_2$) nor contains any significant amounts of oxides of manganese in chemical combination with the oxides of other metals as permanganates. The relative proportions of graphite to $MnO_2$ may vary within certain ranges, depending upon the use for which the cell is designed and depending also upon the source, purity and physical properties of the several depolarizer materials. Thus a permissible range of between about 2 parts to about 50 parts, by weight, of $MnO_2$ may be employed for each 1 part, by weight, of graphite. A narrower range of between about 6 parts to about 30 parts of $MnO_2$ for each part of graphite, on the same weight basis, is preferred.

In general the selection of $MnO_2$ from a particular source will be largely governed by the use for which a given cell is designed and by its adaptability for admixture with graphite and other depolarizer materials in forming a mass which is sufficiently strong to withstand the handling required in assembling the cell. After considerable testing, it has been found that $MnO_2$ from some natural ores as well as some artificially prepared $MnO_2$ may be used. The type and quantity of graphite employed may also be varied if the considerations governing the selection of $MnO_2$ are likewise observed. The graphite may, for some purposes, be replaced wholly or in part with certain types of conductive carbon blacks and may also be partially replaced by finely divided or powdered inactive metals, such as iron and nickel.

For some cell uses it has been found desirable to add mercuric oxide, HgO, to the depolarizer mix, as a partial replacment for a portion of the $MnO_2$. For certain extreme uses as much as 75% of the $MnO_2$ may be replaced by HgO but smaller amounts are preferred. It has been found that where HgO is used in the mix it should be present as a replacement for not less than about 25% of, and not more than about 75% of, the $MnO_2$.

The preferred ratio of materials in the depolarizer-cathode mix may be expressed as follows (all figures being parts by weight):

A

From 1 part of graphite to about 6 parts of $MnO_2$
to
1 part of graphite to about 30 parts of $MnO_2$
or

B

From 1 part of graphite to about 6 parts of between 1 to 3 parts $MnO_2$+3 to 1 parts HgO
to
1 part of graphite to about 30 parts of between 1 to 3 parts $MnO_2$+3 to 1 parts HgO.

It should be understood that the graphite in the foregoing tables may be replaced by conductive carbon black and may partially be replaced by inactive metals. However the presence of copper or its oxides should be avoided.

In all of the depolarizer-cathode mixes referred to above the materials to be mixed should be of small particle size. For the graphite, an average particle size of between about $5\mu$ and about $10\mu$ has been found most satisfactory. For the $MnO_2$, an average particle size of between about $5\mu$ and about $10\mu$ has given satisfactory results with indications that somewhat better results are obtained with average particle sizes of $10\mu$ and slightly higher, even up to $25\mu$. This may be illustrated somewhat differently by saying that finely divided $MnO_2$ 98% of which passes through a 200 mesh screen and 85% of which passes through a 300 mesh screen has a satisfactory average particle size.

In preparing the depolarizer pellets from the above described materials, the selected materials should first be very intimately mixed to form a homogeneous mass. One method of performing this admixing is to feed the selected proportions of dry powdered $MnO_2$ and powdered graphite into a double cone type mixer and therein forming a homogeneous powder. The mixing should be thoroughly performed since materials of substantially different densities are being processed. When thoroughly mixed, the homogeneous powder is then preferably densified. This may be accomplished either by moistening the powder slightly or by omitting any moistening, and pressing the powder into large pellets or slugs. Fairly high pressures, such as may be imposed by a tableting machine or by a hydraulic press should be utilized in forming the slugs. The slugs are then ground up to form small granules, which nevertheless are more free-flowing and dense than the initial powders. The step of forming slugs and re-grinding the slugs to form dense powders may be repeated as often as may seem desirable to produce a homogeneous, densified mix.

The homogeneous, densified mix may either be charged as such into a pellet cup and tableted therein in situ, or may be compressed into preformed depolarizer pellets. Preformed pellets may be made on a tableting machine employing pressures of between about 20,000 to about 30,000 pounds per square inch. When so formed, the completed pellet should be dense enough to withstand considerable handling so that it may be inserted within a pellet cup without breakage or marginal chipping. In fact, it is desirable, after the preformed pellet has been inserted in the pellet cup, to subject the inserted pellet to further compression under pressures of slightly above about 20,000 to about 30,000 pounds per square inch. This further compression may be under steady pressure or by impact. This step not only serves to compact the pellet within the cup, but also serves to smooth and flatten the exposed face of the pellet and depress the exposed face below the marginal lips of the pellet cup wall. Where the powdered densified mix is charged into the pellet cup, the pellet may be formed in situ by compacting under steady or impact pressures of slightly higher magnitude than the pressures used in preforming pellets.

Mention has been made above, of moistening the depolarizer mix. This procedure, which may be termed "pre-wetting," may be employed in certain variations. It is preferable to use, as the pre-wetting liquid, a solution which is similar to the cell electrolyte in nature and concentration. An excellent pre-wetting liquid is the selected electrolyte. For some purposes, an alkali metal hydroxide solution of approximately the same concentration of the same alkali metal hydroxide used in the electrolyte, but without any zinc oxide, as zincate, dissolved therein is preferred. However, the concentration of the pre-wetting liquid need not be the same as the concentration of the electrolyte. For instance, where the electrolyte solution, containing zincate, has a concentration of 43% KOH (dry weight basis) a pre-wetting solution of KOH, without zincate, of 30% to 25% (dry weight basis) or even lower, is very satisfactory.

It will be understood that the amount and concentration of the pre-wetting liquid added to the depolarizer mix will be very carefully controlled so that the aggregate amount and average concentration of the combined pre-wetting solution and subsequently added electrolyte will be properly adjusted.

The anode wafer or disc, may as explained above, be formed of one or more thin circular sheets of coherent zinc or be formed of pelleted zinc powder. In either event, the zinc should be amalgamated. Where zinc powder is pelleted, the powder should be amalgamated prior to pelleting for best results. The amalgamation of zinc powder has been known to the art for many years and may be carried out in a variety of manners all well known to the art. To illustrate in one such method, the pure zinc powder is dropped into an aqueous solution containing mercuric nitrate, slightly acidified with nitric acid and permitted to remain until most of the mercury has been combined with the zinc powder. The amalgamated zinc powder is then washed thoroughly in water until entirely free from nitrate; the wash water is then filtered off and the washed amalgamated zinc powder is then dried, using vacuum drying to remove the last traces of water and minimize danger of oxidation. The amalgamated zinc powder, so prepared, is then pressed into porous pellets on a tableting machine or the like. It is preferred to use tableting pressures in the order of 5,000 pounds per square inch, which pressure is sufficient to compact the amalgamated zinc particles to the desired limited degree. This results in the establishment and maintenance of appreciable interior voids within the pellet and the avoidance of undue densification.

The preformed zinc anode pellet desirably is formed as a relatively thin circular wafer or disc proportioned to fit within the interior bore of the insulating spool. It has been found that the pellets may more readily be inserted within the insulating spool, if during the pelleting operation the peripheral edges of the pellet are compacted or densified under somewhat greater pressure than the major surfaces of the pellet. This edge-compacting provides a denser, stronger rim. The zinc anode may also be formed in situ by metering the desired amount of amalgamated zinc powder into the bore of the insulating spool and compressing the powder into a pellet therein. It will be understood that such an operation is performed after the negative cap has been crimped around the negative end of the insulating spool.

After the anode pellet has been placed in position, or formed in situ in the negative sub-assembly, it is desirable to meter a few drops of electrolyte onto the anode pellet to pre-wet the pellet.

The characteristics and size of the porous wafer 9 are of considerable importance. The wafer preferably should be shaped in the form of a disc having a diameter just slightly larger than the interior bore of the insulating spool. Its height or thickness should be slightly greater than the distance between the otherwise opposed interior surfaces of the depolarizer pellet 5 and the anode pellet 8 when the cell is in completely assembled condition (Figure 3). When so dimensioned, the wafer will be slightly compressed in the final assembly of the cell and will completely fill the space formed between the inner exposed surfaces of depolarizer pellet, anode pellet, insulating spool side wall, and marginal rim of the pellet cup. It should be understood that the foregoing dimensional requirements for the porous wafer should be satisfied both when the wafer is dry and when wetted with electrolyte.

The wafer should moreover be formed of material which has certain definite related properties. It should be capable of absorbing, and holding absorbed, considerable quantities of liquid. However, it should not expand unduly when wet with liquid and conversely, it should not contract unduly when deprived of absorbed liquid. Importantly, it must be capable of demonstrating these properties in the prolonged presence of the alkaline electrolyte solution; therefore, it must not be attacked by alkali metal hydroxide solutions of varying concentrations nor by the reactants, or products of reaction, of any chemical reaction which may occur within the cell. Certain essentially cellulosic materials possess the required properties as demonstrated by many tests. One such material is that commonly known as cellulose sponge produced by E. I. du Pont de Nemours and Company. One difficulty with this material is the lack of ease with which it may be cut into discs of the required small sizes. Another satisfactory product is an alkali resistant matted paper produced under the tradename "Webril."

As indicated hereinabove, the electrolyte may be gelled and discs or wafers of the gel used either in place of, or in conjunction with, a cellulosic porous wafer. The two cellulosic materials which have been given as illustrations just above, have been found satisfactory without the use of a gelled electrolyte.

The amount and concentration of the electrolyte are also factors of considerable importance. From a broad viewpoint, the electrolyte is primarily a solution of an alkali metal hydroxide dissolved in water. The more common sodium hydroxide and potassium hydroxide may be used with practically equal facility, but of the two, potassium hydroxide is preferred in spite of its relatively higher cost because of its relatively greater conductivity. The aspect of cost tends to discourage the use of the other less common alkali metal hydroxides, such as lithium or caesium, but such hydroxides are satisfactory in performance and may be used. The concentration of the hydroxide, as determined on a dry weight basis, in a given solution, may vary within a considerable range. Concentrations of between about 20 percent KOH to about 75 per cent KOH may be employed. In general, somewhat better conductivity is experienced at lower concentrations. A preferred concentration is about 45 per cent KOH, or within a narrower range of 30 per cent to 50 per cent KOH.

It has been found that the performance of the cell under a wide variety of conditions is greatly improved by adding to the alkaline hydroxide solution minor amounts of zinc oxide to form, in solution, a mixture of the alkali metal hydroxide and the corresponding alkali metal zincate. The prior art and the published literature on this subject are not altogether in accord as to the amounts of zinc oxide required to saturate given solutions of alkali metal hydroxide. As the result of numerous tests, it is the belief of the present inventor and his associates that a solution consisting of 100 parts of water and 100 parts of potassium hydroxide (dry weight basis) can dissolve considerably more than 20 parts, by weight, of zinc oxide without forming a supersaturated solution or one which will precipitate the zinc salts. In other words, in such a solution, 20 parts by weight of added zinc oxide do not completely saturate what is initially a 50 per cent potassium hydroxide solution. The present invention proposes to add zinc oxide to the potassium hydroxide (or other alkali metal hydroxide) solution, in amounts which are far less than those required to saturate the solution with potassium zincate. In general, it is preferred to use, as the electrolyte solution, an alkali metal hydroxide solution which contains in solution between about 2 parts by weight and about 10 parts by weight of dissolved zinc oxide for each 100 parts of alkali metal hydroxide originally present. Such solutions, illustrated with potassium hydroxide, may be prepared by dissolving in a small amount of water sufficient chemically pure potassium hydroxide pellets (which may contain 88 per cent KOH on a dry weight basis, and about 12 per cent water and minor impurities), dissolving zinc oxide therein and then adding enough water to adjust the concentration of the potassium hydroxide solution to the desired figure.

By way of example, a small amount of water, say 50 grams, is added to 114 grams of 88% C. P. KOH pellets. This mixture will consist of 100 grams of KOH (dry weight) and 50 plus 14, or 64 grams of water. The mixture is heated to 150° C., at which temperature all of the KOH will have quickly gone into solution. To this solution, at this temperature, are added 5.57 grams of ZnO, which dissolves rapidly. This solution is then cooled to about 90° C. and 36 grams of water are added to make the desired final electrolyte solution. This final solution will contain 101.22 grams of water having dissolved therein, as such, 92.33 grams of KOH and 12 grams of $K_2ZnO_2$, each on a dry weight basis. The final solution will contain 48% KOH and 10.6% $K_2ZnO_2$, based on the water and each salt separately computed. The weight ratio of KOH to $K_2ZnO_2$ in the solution is 92.33 to 12 or approximately 8 to 1. The foregoing is clear from the equation:

$$2KOH + ZnO \rightarrow K_2ZnO_2 + H_2O$$
$$112 + 81.4 \rightarrow 175.4 + 18$$

In compliance with this equation, the added 5.57 grams of ZnO consumes 7.67 grams of KOH and produces 1.22 grams of water while forming 12 grams of $K_2ZnO_2$. The original 100 grams of KOH in the solution is reduced by 7.67 grams leaving 92.33 grams of free, uncombined, dissolved KOH. The original 100 grams of $H_2O$ in the solution is increased by 1.22 grams, leaving 101.22 grams of $H_2O$ in the solution.

If a solution of 100 grams of KOH in 100 grams of $H_2O$ is similarly prepared, but with the addition of 2 grams of ZnO the final solution will contain 100.44 grams of $H_2O$, 97.25 grams of KOH as such, and 4.31 grams of $K_2ZnO_2$ as such, in solution. The concentration of uncombined, dissolved KOH is 49.3% and the concentration of $K_2ZnO_2$ is 4.12%. The weight ratio of KOH to $K_2ZnO_2$ in this solution is 22.5 to 1. In general, KOH to $K_2ZnO_2$ weight ratios of from about 3.5 to 1 to about 10 to 1 are preferred, although ratios of from about 3.1 to 1 to about 25 to 1 may be employed.

As stated above, the amount of zincate which is required to saturate any given potassium hydroxide solution is not fully established by the literature. It is possible that the reason for this lies in the failure of prior art workers to mention the temperature at which the given solutions were formed or subsequently maintained. Additionally, prior art workers seem to have ignored the chemical fact that the formation of potassium zincate by the addition of zinc oxide uses up some of the potassium hydroxide in the solution and liberates water thereby modifying the actual potassium hydroxide concentration in the final solution. To avoid any ambiguity, the recommended electrolyte solution in this specification is to be understood as consisting of the three components—water, potassium hydroxide, and potassium zincate, each computed as such and existing as such in the ultimate solution. The presence of potassium zincate in the potassium hydroxide electrolyte is intended to reduce attack on the zinc anode and to keep gassing within the cell to a practical minimum. The foregoing considerations are partially achieved by increasing the concentration of potassium hydroxide in the electrolyte solution but are augmented by the presence of dissolved zincate. In general, the amount of dissolved zinc oxide present as zincate and required for optimum results varies inversely with the concentration of the electrolyte. Thus, the more concentrated electrolytes require less dissolved zinc, present as zincate, while the less concentrated electrolytes require appreciably more dissolved zincate. In any event, the amount of zincate provided for in the present electrolyte is very much less than 50 per cent of the amount of zincate required to saturate the given electrolyte solution.

While it is recognized that the numerical dimensions of mechanical objects are not normally the subject of specifications, the use of certain dimensions in describing an illustrative example of the present invention will be very helpful. Referring to Figure 1 of the drawings, as to this one form of the cell, the positive and negative caps 1 and 2 have, when crimped, a width of ½ inch. Referring to Figure 3 of the drawings, the assembled cell, from the top of the positive cap to the bottom of the negative cap, has a thickness of approximately ¼ inch. The interior bore of the insulating spool has a diameter of approximately ⅜ of an inch. The pellet cup has a depth of slightly less than ⅛ of an inch. From these dimensions, it will be seen that the complete cell is quite small and that the anode pellet and porous wafer are quite thin. Within a cell of the dimensions given hereabove, there may be utilized a total of .22 gram of electrolyte solution. In pre-wetting the depolarizer pellet, it is preferred to use .06 gram of electrolyte solution. Thus, in assembling the cell, .06 gram of electrolyte are added as pre-wetting liquid in the depolarizer pellet, also a drop or two, barely measurable in amount, may be added in pre-wetting the zinc anode pellet. The remainder consisting of approximately .16 gram of electrolyte, is metered onto the porous spacer immediately prior to final assembly of the cell. It has been found that when the electrolyte is added in such increments to the depolarizer pellet and to the anode pellet, the porous wafer tends to retain the optimum amount of absorbed electrolyte. In other words, the essentially porous anode pellet and the considerably less porous depolarizer pellet do not absorb electrolyte thereby leaving the porous wafer impoverished with respect to absorbed electrolyte. Reference was made above to the desired property of the porous wafer of retaining absorbed electrolyte without shrinkage even during prolonged exposure to a relatively concentrated potassium hydroxide solution. It may be stated more specifically, that the porous wafer should retain, for optimum results, a minimum of .14 gram of electrolyte for a cell of the dimensions given above.

In describing the improved cell, which is the subject matter of this application, certain variables and equivalents have been given from time to time for several of the elements of the cell. For the sake of illustration, a preferred completed cell may consist of a plain steel positive cap 1, a tin-plated negative cap 2, a methyl methacrylate plastic, such as Lucite, insulating spool, a plain steel pellet cup 4, and a pelleted, amalgamated zinc powder, anode 3. The depolarizer cathode pellet 5 may consist of 1 part graphite to (20 parts of $MnO_2$ and 10 parts of HgO) each by weight, pelleted as described herein and pre-wet with a small amount of the electrolyte. The porous wafer is of Webril and the electrolyte has a final concentration of 48% KOH and a final concentration of 10.6% $K_2ZnO_2$; the latter two dissolved components being present in a weight ratio of 8 to 1. The primary seal at each end of the cell is a neoprene washer and the secondary seal is a thin coating of petrolatum applied to each end of the insulating spool just prior to capping.

In this typical cell a modified proceeding of forming the electrolyte solution is desirably employed. The pure zinc oxide powder is moistened with sufficient (measured amount) water to form a pasty suspension. The measured amount of pure solid KOH (pellets of known purity and water content) is added to the zinc oxide paste. The mixture is then heated to about 150° C. at which temperature both solids readily dissolve in the water present, attended, of course, by the desired chemical reaction between the zinc oxide and part of the KOH. The clear solution is cooled to about 90° C. and sufficient make-up water is added to give the desired concentration. The solution is then filtered to remove any solid impurities such as dust particles and cooled to room temperature.

*Mode of operation*

The cell system used in the cells described above may be written as $Zn/KOH/MnO_2$. The voltage of cells with this system is about 1.52 when new, and decreases in a few weeks at room temperature to a normalized value of about 1.48 volts. The voltage varies slightly with the type of manganese dioxide used and also with the ratio used in the depolarizing mix. Higher ratios of manganese dioxide give cells of slightly higher voltages.

At the zinc anode, the zinc is converted during discharge into a soft paste of ZnO or ZnO hydrates. Although the electrolyte is far from saturated with zincate, the rate of solution of the ZnO is so slow at room temperature that very little dissolves to form the zincate. The color and form of the ZnO varies considerably with the drain. At relatively high drains, the ZnO is medium to dark blue and is quite firm. At relatively low drains, the ZnO is in the form of a soft light blue paste.

The depolarizer is used mainly according to the equation

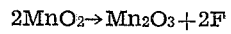

$$2MnO_2 \rightarrow Mn_2O_3 + 2F$$

During use, the depolarizer changes from a black to a brown color; the degree of brownness roughly indicating the extent to which the cell has been discharged. The above conversion takes place at a relatively high efficiency of about 90 to 100 per cent at moderate drains and to the lower end points such as .90 and .80 volt per cell. On very low drains and to low end points, the depolarizer becomes a yellow-red color, probably due to the formation of some Mn oxides lower than $Mn_2O_3$. During discharge, the depolarizer gradually absorbs electrolyte from the absorbent layer and expands considerably in height, the amount of expansion being a very good indication of the extent to which the cell is used. At the same time, a very hard crust is formed on the surface of the depolarizer.

Both the total amount of electrolyte and the ratio of electrolyte to absorbent are very important in these cells in order to obtain the highest capacity and greatest efficiency. It is usually desirable to use an absorbent which will give a high ratio of absorbed electrolyte to absorbent since the cells are usually made with the total amount of electrolyte near the lower critical limit to avoid excessive migration of electrolyte within the cell. Because of this factor, it is desirable to have some electrolyte initially in the depolarizer, thereby increasing the total amount of electrolyte and also improving the capacity of the cells when subjected to relatively heavy drains. During discharge, the electrolyte from the absorbent is absorbed by both the ZnO and depolarizer, mostly by the latter. During use, the absorbent continually becomes drier and is compressed more by the expansion of both the depolarizer and the conversion of Zn to ZnO at the anode. At the end of the cells' useful life, the absorbent is almost completely dry. The latter is a very important effect since no leakage can occur after discharge, and such cells really become incapable of leaking. This is the direct opposite effect from that sometimes occurring in Leclanche-type dry cells which tend to leak after discharge has been completed.

Cells made according to the above described construction and composition have very high capacity per unit volume. In fact, this factor is about 2 to 3 times that of Leclanche-type dry cells of the same size the ratio depending slightly upon the drain. The discharge curve is about the same as for the Leclanche dry cell, but is slightly flatter in the middle portion. Because of the high efficiency in the conversion of the $MnO_2$ into $Mn_2O_3$, the capacity of cells can be readily calculated from the a.-hr. rating which depends directly on the amount of depolarizer and zinc. The efficiency usually decreases a slight amount as the drain is increased within the normal range suitable for a particular size of cell. A cell of about ½ inch in diameter and slightly less than ¼ inch high has a capacity of about 150 ma.-hr. at drains of 2 ma. or less. Because the terminals are at opposite ends, such cells are admirably suited for making higher voltage "B" batteries by simply stacking one on the other. This method of cell assembly is easy and provides a cheap battery construction.

During discharge, there is a slight expansion in the external height of the cell. However, most of the considerably greater expansion of the depolarizer and of the conversion of zinc to ZnO at the anode is taken up by compression of the absorbent. This effect has a definite advantage since the internal pressure within the cell increases during discharge, thus insuring good contacts, and the reduced thickness of the absorbent keeps the internal resistance low, even when the electrolyte is being absorbed from the absorbent by the anode and cathode. A slight external expansion is also advantageous since it helps maintain good contacts between the cells in battery stacks.

The most desirable depolarizer ratio depends considerably on the drain for which the cells are to be used. The capacity of the cells also depends considerably on the packing factors of the various ratios of depolarizing mix. In order to insure complete use of the depolarizer, an excess of zinc in the anode is used, this excess usually being about 20 to 30 per cent. The exposed area of the zinc anode also has an important effect on the permissible drains of the cells. For most applications, a highly porous zinc pellet is preferred since it has a relatively large surface area and also holds some electrolyte. For very light drains, a flat zinc plate or a series of such plates is quite satisfactory.

Small cells made according to the above construction and composition find very suitable applications in "B" batteries for hearing aids, pocket and small portable radios. Larger cells may be used as "A" batteries for hearing aids and pocket radios and also as "B" batteries for larger portable radios. There are also many military uses for this type of cell since such cells have a high efficiency at relatively high drains and are small in volume and of light weight. In many other applications, these cells will give about twice the capacity of the ordinary Leclanche dry cells for the same volume, or batteries of about the same capacity can be made which are about one-half the size of the conventional dry cell batteries.

I claim:

1. A primary dry cell comprising a pair of matching conductive, metallic caps, the side walls of each of which are crimped around flanges at opposite ends of a hollow-bored substantially rigid insulating spool, the side walls of which are imperforate, the said metallic caps having flat exterior faces which provide, respectively, symmetrical positive and negative cell terminals insulated from each other and disposed at opposite ends of the cell, the said caps and the said hollow-bored insulating spool cooperating to form a sealed, substantially fluid-tight, interior compartment within the cell and within which cell reactants including depolarizer are disposed.

2. The primary dry cell defined in claim 1 wherein a zinc disc anode is disposed within the hollow bore of the insulating spool and in physical contact with the inner face of the negative metallic cap.

3. The primary dry cell defined in claim 1 wherein a compressed, cathode-depolarizer mass is disposed within the hollow bore of the insulating spool, adjacent and in conductive contact with the inner face of the positive metallic cap.

4. The primary dry cell defined in claim 1 wherein a zinc disc anode is disposed within the hollow bore of the insulating spool and in physical contact with the inner face of the negative metallic cap, wherein a compressed, cathode-depolarizer mass is disposed within the hollow bore of the insulating spool, adjacent and in conductive contact with the inner face of the positive metallic cap, and wherein an electrolyte-immobilizing wafer is disposed, under compression, within said hollow bore between said anode and said cathode-depolarizer mass.

5. The primary dry cell defined in claim 1 wherein a compressed cathode-depolarizer mass is positioned within a metallic cup, the base of which is affixed to the central inner face of the positive metallic cap in physical and conductive contact therewith, and the side walls of which are positioned within the hollow bore of the insulating spool.

6. A flat, essentially symmetrical primary dry cell comprising a dish-shaped positive metallic cap, an opposed dish-shaped negative metallic cap, said caps being positioned at the opposite ends of a hollow-bored substantially rigid plastic insulating spool, said spool having peripheral flanges at both ends and having imperforate side walls, the side walls of said metallic caps being crimped over and under the adjacent peripheral flanges, respectively, a metallic cup having its base affixed substantially centrally to the inner face of the positive cap and its side walls depending within and closely adjacent the interior wall of the hollow bore, a compressed depolarizer-cathode pellet positioned within said metallic cup, an amalgamated zinc anode, an electrolyte immobilizing wafer disposed under compression between said anode and the exposed face of said depolarizer-cathode pellet, said anode, said wafer and said pellet all being positioned within said hollow bore.

7. The primary dry cell defined in claim 6 wherein the ends of said insulating spool are sealed against the inner surfaces of said positive and negative caps respectively.

8. The primary dry cell defined in claim 6 wherein the zinc anode is a compressed disc of amalgamated zinc particles.

9. The primary dry cell defined in claim 6 wherein the depolarizer cathode pellet comprises a compressed homogeneous mixture containing a minor amount of graphite and a major amount of a metallic oxide compound from the group consisting of manganese dioxide, mercuric oxide and mixtures of manganese dioxide with mercuric oxide.

10. The primary dry cell defined in claim 6 wherein the electrolyte immobilizing wafer is a disc of essentially cellulosic fibers, characterized by high moisture-retentiveness, resistance to shrinkage when exposed to strong alkaline solutions and limited expansion where wetted.

11. In a primary dry cell the improvement which consists in supporting a compressed, homogeneous mass of fine particles of depolarizer-cathode mix within an open-end metallic cup the base of which is physically affixed to the interior face of the positive cell terminal and in conductive contact therewith and wherein the exposed face of the compressed mass is disposed within and below the marginal rim of the cup side walls.

12. The improvement defined in claim 11 wherein the homogeneous mass of fine particles of depolarizer-cathode mix are moistened with an alkaline aqueous solution and then compressed within the cup.

13. A primary electric dry cell comprising, a hollow substantially rigid body portion having imperforate side walls of electrically insulating material provided with spaced apart shoulders, a cup-shaped terminal plate at each end of the body portion, each of said plates having a marginal skirt formed with edges engageable under said shoulders for tightly holding the plate against an end of the body portion to close the hollow thereof, active ingredients in the hollow of the body portion added before the hollow is closed by the last one of said plates and in conductive relation to said plates, said cell being constructed so that a plurality of them may be stacked and be portable for use with the stack in any position, the imperforate side walls and the closed plates thereon hermetically sealing the active ingredients in the cell, a sealing ring gripped between each plate and the adjacent end of the side walls, said active ingredients including a depolarizer mix pellet of less height than the hollow of the body portion, an anode member and an electrolyte-carrier between said pellet and said anode member.

14. A primary electric dry cell comprising a body portion of substantially rigid electrically insulating material having a pair of externally projecting shoulders and having imperforate side walls which define a central cavity in said body, a mixture of electrolyte and depolarizer mix substantially filling said cavity, a metal terminal cup at each end of said body portion, said cups each having a base portion, which covers an end of said body portion including the end of said cavity, and a skirt portion in frictional engagement with one of said projecting shoulders, anodic material disposed inside of the base portion of one of said cups and covering the adjacent end of said cavity, cathodic material disposed inside the base portion of the other of said cups and covering the adjacent end of said cavity and means sealing the ends of said insulating body portion within said cups whereby the reactive cell components including the depolarizing mix and electrolyte fluids are confined within said body cavity and between said cups.

15. A primary electric dry cell comprising a body portion of substantially rigid electrically insulating material having a pair of externally projecting shoulders and having imperforate side walls which define a central cavity in said body, said cavity being substantially filled with electrolyte, depolarizer and cathodic material, a metal terminal cup at each end of said body portion, said cups each having a base portion, which covers an end of said body portion including the end of said cavity, and a skirt portion in frictional engagement with one of said projecting shoulders, anodic material disposed inside of the base portion of one of said cups and covering the adjacent end of said cavity, said cathodic material being disposed inside the base portion of the other of said cups and covering the adjacent end of said cavity and means sealing the ends of said insulating body portion within said cups whereby the reactive cell components including the depolarizer and electrolyte fluid are confined within said body cavity and between said cups.

16. The primary dry cell as defined in claim 15 wherein the skirts of said cups are crimped into substantially permanent frictional engagement with said insulating body shoulders.

17. The primary dry cell as defined in claim 15 wherein the anodic material is a body of zinc disposed in conductive contact with the inner face of one of said cups.

18. The primary dry cell as defined in claim 15 wherein one of said cups is formed of zinc to provide the anode for said cell.

19. The primary dry cell as defined in claim 15 wherein said insulating body portion is in the form of a cylinder provided with annular shoulders and wherein the said body cavity is in the form of a cylinder.

20. A primary dry cell comprising a pair of conductive metallic caps, each of said caps having side walls crimped downwardly and inwardwardly around the end sides of a hollow bored, substantially rigid insulating spool, the side walls of which are imperforate, the side walls at each end being shouldered, the said metallic caps having flat exterior end faces adapted to provide flat cell terminals, insulated from each other by said spool, of substantially equal shape and size, and having flat interior faces which completely cover the ends of said hollow bore, thereby forming a sealed interior compartment, electrodes, electrolyte and depolarizer within said sealed interior compartment and in electrically conductive contact with said metallic caps.

21. The device defined in claim 20 wherein a pellet of depolarizer mix, an electrolyte-carrier and a disc of anodic metal are disposed in electrically conductive relationship within said bore and between the inner faces of the said metallic caps which cover the ends thereof.

22. The device defined in claim 20 wherein a ring of sealant, inert to the electrolyte, is compressed between the inner face of at least one of said metal caps and the subjacent end edge of said insulating spool.

23. The device defined in claim 22 wherein an electrolyte comprising an aqueous solution of an alkaline metal hydroxide is disposed within said hollow bore and sealed therein.

WILLIAM S. HERBERT.

(References on following page)

References Cited in the file of this patent

UNITED STATES PATENTS

| Number | Name | Date |
|---|---|---|
| 1,123,843 | Burger | Jan. 5, 1915 |
| 1,219,074 | Bronsted | Mar. 13, 1917 |
| 1,228,359 | Ellis | May 29, 1917 |
| 1,473,048 | Roberts | Nov. 6, 1923 |
| 1,588,726 | Hendry | June 15, 1926 |
| 1,634,006 | Yngve | June 28, 1927 |
| 1,920,151 | Ruben | July 25, 1933 |
| 2,170,436 | Vogel | Aug. 22, 1939 |
| 2,200,862 | Redfern | May 14, 1940 |
| 2,354,855 | Emanuel | Aug. 1, 1944 |
| 2,422,045 | Ruben | June 10, 1947 |
| 2,458,878 | Ruben | Jan. 11, 1949 |
| 2,472,379 | Lawson | June 7, 1949 |
| 2,480,839 | Daniel | Sept. 6, 1949 |

FOREIGN PATENTS

| Number | Country | Date |
|---|---|---|
| 29,847 | Great Britain | Dec. 27, 1912 |
| 671,707 | France | Sept. 7, 1929 |